UNITED STATES PATENT OFFICE.

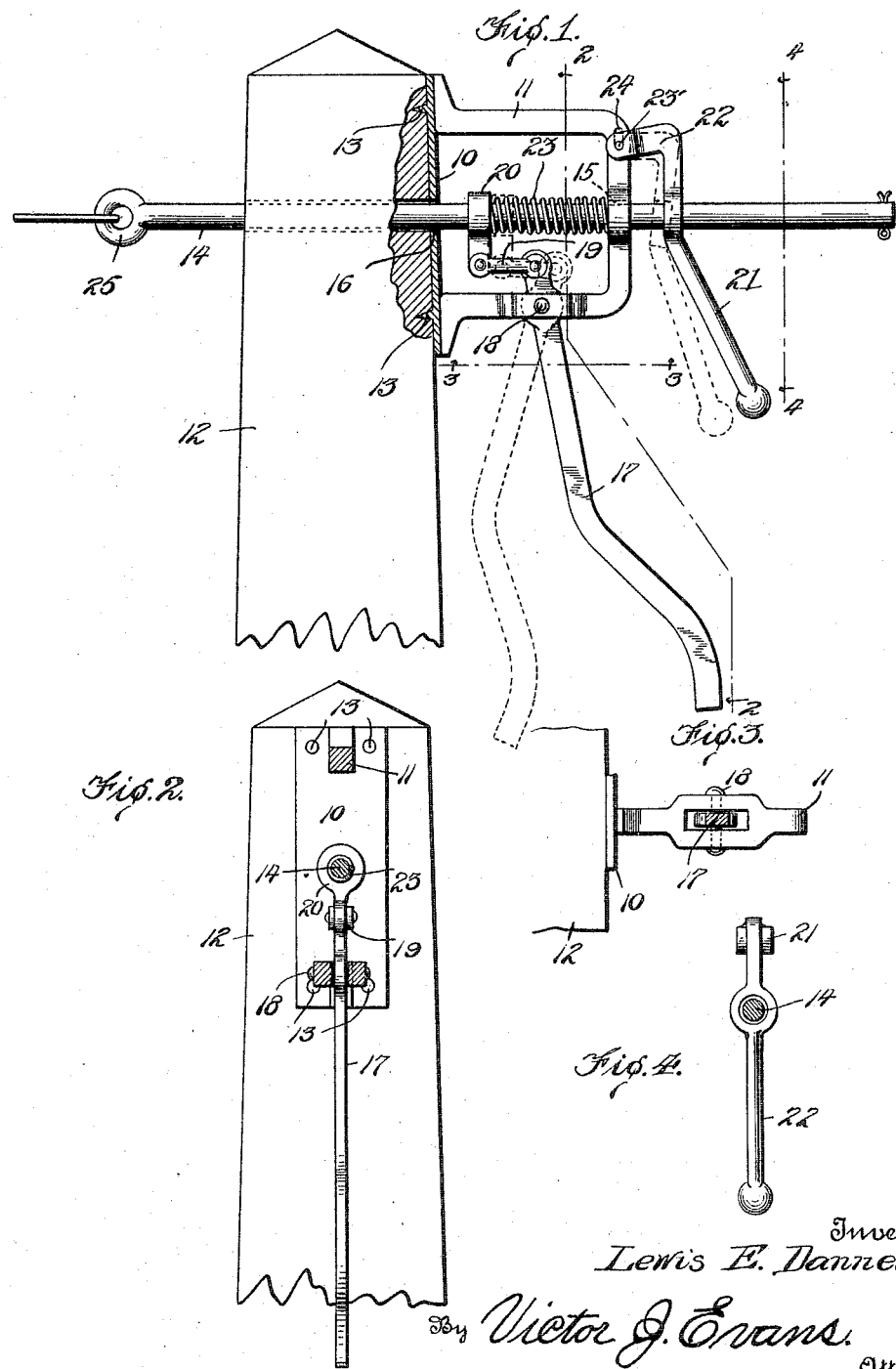

LEWIS EDWIN DANNER, OF CATASAUQUA, PENNSYLVANIA.

WIRE-STRETCHER.

1,305,779.   Specification of Letters Patent.   Patented June 3, 1919.

Application filed July 6, 1918. Serial No. 243,606.

*To all whom it may concern:*

Be it known that I, LEWIS E. DANNER, a citizen of the United States, residing at Catasauqua, in the county of Lehigh and State of Pennsylvania, have invented new and useful Improvements in Wire-Stretchers, of which the following is a specification.

The object of the invention is to provide a simple, relatively inexpensive and efficient stretching apparatus designed for use in connection with clothes lines, fence wires and the like for the purpose of subjecting the same to the required tension and capable without modification of being used in a number of different analogous capacities and of being applied in the operative relation with the object to be stretched with facility and despatch.

Further objects and advantages will appear in the course of the following description of a preferred embodiment, it being understood that changes in form, proportion and details may be resorted to within the scope of the appended claim, without departing from the spirit of the invention.

In the drawings:—

Figure 1 is a side view of an apparatus embodying the invention arranged in its operative position, portions of the same being broken away, and the holding clutch and operating lever being shown both in full line and dotted line positions.

Figs. 2, 3 and 4 are detail sectional views respectively on lines 2—2, 3—3 and 4—4 of Fig. 1.

The stretcher embodying the invention consists essentially of a bracket having a base or bearing plate 10 and an arch 11, the former having suitable means for engagement with an object such as a post 12 and consisting as illustrated of short spurs 13 of which obviously any equivalent may be employed, a tension rod 14 extending through registering guide openings 15 and 16 in said arch and base or bearing plate, an operating lever 17 fulcrumed as at 18 in a bearing formed in one arm of the arch and having connected therewith by a link 19 the operating clutch 20, and a holding or retaining clutch 21 also carried by the arch of the bracket and having a handle 22 by which it may be released. Interposed between the operating clutch 20 and the center of the arch is a spring 23 which yieldingly holds the said clutch in position for engaging the tension rod 14 when the handle is moved for example from the position indicated in full lines in Fig. 1 to that indicated in dotted lines, the clutch having a rod engaging jaw which is of a contour corresponding with but slightly larger in diameter than the rod so as to grip the surface of the latter when the jaw is inclined at a slight angle to the axis of the rod. The same construction of the jaw is provided in the holding or retaining clutch 21 of which the upper arm 22 is pivotally mounted upon the arch of the bracket by means of a pin 23′ engaging a slot 24 so that a limited freedom of movement of the pivotal end of the locking or holding clutch with reference to the arch of the bracket is permitted. In full lines this element is shown in the position which it assumes when the lever is being moved from the full line to the dotted line position.

In dotted lines said holding or retaining clutch is shown in the position which it assumes when the advance movement of the tension rod under the influence of the operating lever has been made and the tendency of the said rod is to move backward or in the opposite direction to that in which it was moved by the operating lever. Said holding or retaining clutch jaw then engages the rod and maintains it in position during the return stroke of the operating lever, incidental to which is the release of the operating clutch from the rod by the action of the spring 23.

The tension or feed rod may be provided as shown with a terminal eye 25 to facilitate engagement with the fence wire or clothes line or other flexible object which it may be desired to tighten, or to which it may be desired to apply tension greater than that which can be applied ordinarily by directly manual effort.

From the foregoing description it will be seen that the apparatus is simple in construction, that there are no detachable parts which can be displaced or mislaid, and the apparatus may be set up wherever it is needed for use, simply by placing the base or bearing plate in contact with a fixed object capable of affording it the necessary support to resist the tension which may be applied to the wire or line by the action of the tension rod.

What is claimed is:—

A stretching apparatus having a bracket provided with a bearing base and arch, the former of which is adapted for contact with an upright supporting surface, a tension rod arranged in horizontally registering openings in said base and arch, and operating and retaining clutches having jaws engaging said tension rod, an operating lever fulcrumed upon the arch and having a link connection with the operating clutch, the retaining clutch having a pivotal and sliding connection with the arch, and a spring for actuating the operating clutch interposed between the latter and the arch.

In testimony whereof I affix my signature.

LEWIS EDWIN DANNER.

Copies of this patent may be obtained for five cents each, by addressing the "Commissioner of Patents, Washington, D. C."